INVENTORS.
Frederick A. Kappelmann
BY Boyd S. Weaver

ATTORNEY.

Jan. 18, 1966  F. A. KAPPELMANN ETAL  3,230,036
METHOD FOR SEPARATING AMERICIUM AND CURIUM FROM THE
LANTHANIDE RARE EARTHS AND YTTRIUM
Filed Sept. 18, 1963                    2 Sheets-Sheet 2

INVENTORS.
Frederick A. Kappelmann
BY  Boyd S. Weaver

ATTORNEY.

United States Patent Office 3,230,036
Patented Jan. 18, 1966

3,230,036
METHOD FOR SEPARATING AMERICIUM AND CURIUM FROM THE LANTHANIDE RARE EARTHS AND YTTRIUM
Frederick A. Kappelmann and Boyd S. Weaver, Oak Ridge, Tenn., assignors to the United States of America as represented by the United States Atomic Energy Commission
Filed Sept. 18, 1963, Ser. No. 309,906
10 Claims. (Cl. 23—14.5)

Our invention relates to methods for processing neutron-irradiated fissile materials, and more particularly to methods for separating americium and curium from lanthanide rare earth elements. The invention described herein was made in the course of, or under, a contract with the United States Atomic Energy Commission.

Solvent extraction processes are especially useful in separating highly radioactive elements from each other or from inert elements, and such processes have been developed for separating americium and curium from rare earth fission products. See, for example, Patent Number 3,178,256 in the name of F. L. Moore for "Method for Separating Transplutonium Elements from Rare Earth Fission Products." These solvent extraction processes require the presence of chloride in a high concentration in the aqueous phase. This requirement increases equipment costs because of the corrosive effect of chloride and causes process control difficulties because chloride is decomposed in zones of high alpha activity. This decomposition presents problems in maintaining the concentration of chloride at a desired value.

Attempts have been made to provide solvent extraction methods using chloride-free aqueous solutions. These prior attempts have not been successful in obtaining good separation of americium and curium from the rare earths. For instance, in attempting to separate these actinides from rare earths using a dialkylphosphoric acid as an agent to extract values from a nitrate solution, americium has about the same extraction coefficient as praseodymium and virtually no separation of these two elements is achieved.

It is accordingly one object of our invention to provide an improved solvent extraction process for separating americium and curium from the lanthanide rare earth elements.

It is another object to provide such a process which does not require the use of a chloride-containing solution.

It is still another object to provide such a solvent extraction process wherein the solutions used are relatively stable in the presence of radiation.

We have discovered that monoacidic organophosphorus compounds unexpectedly preferentially extract yttrium and the lanthanide rare earths from an aqueous solution containing an organic acid and an aminopolycarboxylic acid, leaving americium and curium in the aqueous phase. In accordance with our invention, we have provided a process for separating actinide values selected from the group consisting of americium and curium values from an aqueous mixture containing said actinide values together with fission product values selected from the group consisting of yttrium and lanthanide rare earth values comprising the steps of:

(a) Providing said aqueous mixture with an amino-polycarboxylic acid and a water-soluble organic acid having the formula $$R_1COOH$$

where $R_1$ is a radical selected from the group consisting of hydrogen, alkyl, hydroxyalkyl, aminoalkyl, and alkylcarboxyl;

(b) contacting the resulting aqueous solution with a substantially water-immiscible organic extractant comprising a diluent and a monoacidic organophosphorus compound selected from the group having the formula

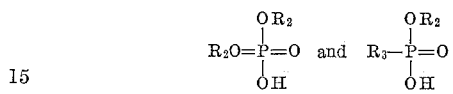

where $R_2$ is an alkyl radical and $R_3$ is selected from the group consisting of alkyl and aryl radicals;

(c) separating the resulting fission product-containing organic extractant from the resulting aqueous mixture; and (d) recovering actinide values from the separated aqueous mixture.

An excellent separation of americium and curium values from yttrium and the rare earth fission product values is achieved by our process, single stage separation factors greater than 100 being reached; furthermore the solutions are relatively stable in the presence of radiation and are non-corrosive; consequently, relatively inexpensive materials may be used for equipment.

Figure 1:
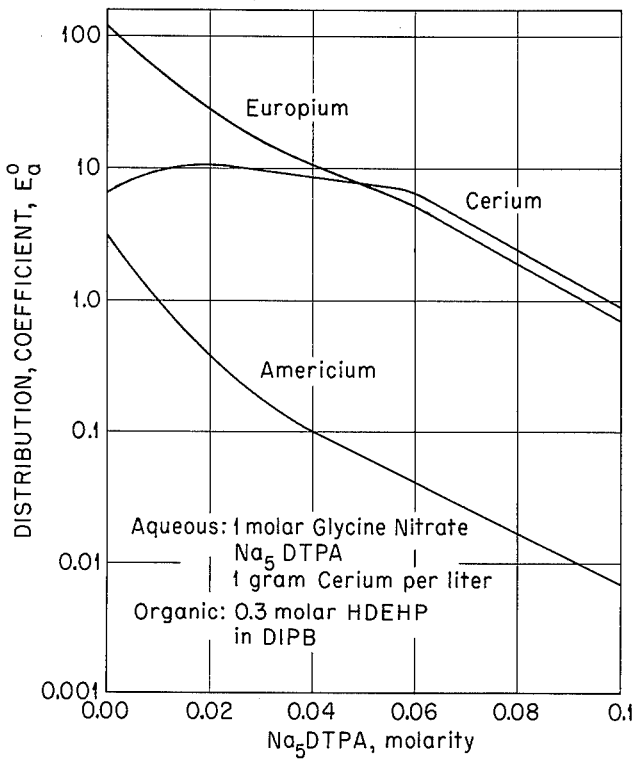
FIG. 1 shows the relationship between the extraction coefficients and the concentration of an aminopolycarboxylic acid for americium and two rare earths.
Figure 2:
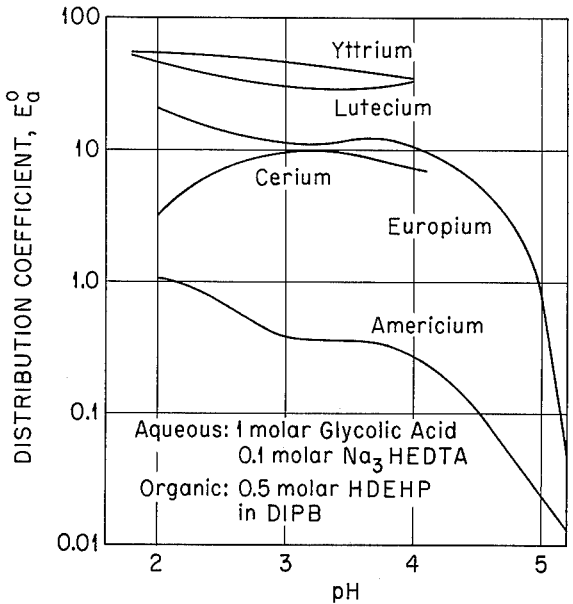
FIG. 2 shows the relationship between the extraction coefficients and the pH of aqueous solution for americium and several rare earths.
Figure 3:
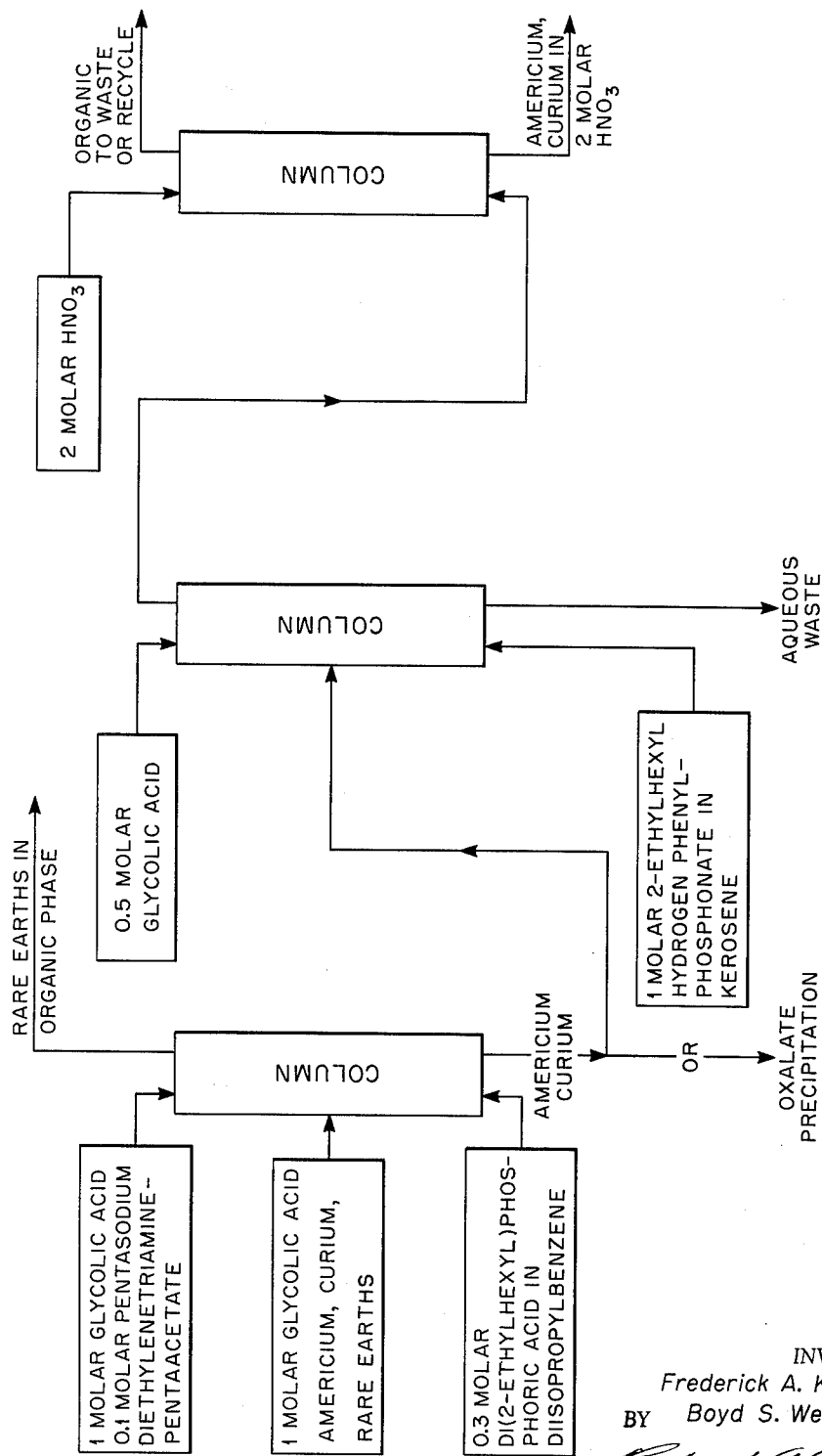
FIG. 3 is a flowsheet for one typical method of carrying out our process in continous countercurrent fashion.

In the first step of our process, an aqueous mixture of americium or curium or both together with the rare earth elements from which the actinide values are to be separated is provided with the carboxylic acid and the aminopolycarboxylic acid. The presence of at least one compound from each class is necessary in carrying out our process. While the organic extractants such as dialkylphosphoric acids show some preferential extraction of one group of elements over another from a carboxylic acid, the separation factor is low. On the other hand, although a high selectivity is shown in extracting from a solution containing an aminopolycarboxylic acid in the absence of a carboxylic acid, extraction of some rare earths reaches equilibrium only after long contact time. The carboxylic acids have the effects of (1) reducing the time required to reach equilibrium, (2) increasing the solubility of aminopolycarboxylic acids, and (3) providing a buffering action to maintain the pH at a desired value.

The carboxylic acid may be any water-soluble carboxyl-containing compound. We have found that acids containing no substituent groups such as formic acid and acetic acid, hydroxy acids such as glycolic acid, α-hydroxyisobutyric acid, mandelic acid, and lactic acid, hydroxy acids having two or more carboxyl groups such as tartaric acid, citric acid, malic acid, acids having two or more carboxyl groups such as maleic acid, malonic acid, and diglycolic acid, and salts of amino acids such as glycine nitrate are useful in our process. The preferred acids are the hydroxy acids containing one carboxyl group as exemplified by glycolic and lactic acid.

We have found that the separation factor increases with an increase in concentration of the carboxylic acid. The carboxylic acid concentration in the aqueous phase may range from 0.25 to 5 molar, and the preferred concentration is about 0.5 to 2 molar.

The aminopolycarboxylic acid may be a simple one such as iminotriacetic acid, $N(CH_2COOH)_3$ or one as complex as triethylenetetraaminehexaacetic acid. Other suitable aminopolycarboxylic acids are hydroxyethylethylenediaminetriacetic acid, ethylenediaminetetraacetic acid, diethylenetriaminepentaacetic acid, and 1,2-diaminocyclohexanetetraacetic acid. The preferred compound is diethylenetriaminepentaacetic acid.

While the presence of even small amounts of aminopolycarboxylic acids may increase the separation of actinides and lanthanides from each other, a significant change is ordinarily not achieved until the concentration of aminopolycarboxylic acid reaches about 0.005 molar. The separation factor increases with an increase in the concentration of aminopolycarboxylic acid at least up to about 0.05 molar. The preferred concentration is about 0.05 to 0.1 molar. There is no advantage to be gained in increasing the concentration above about 0.2 molar, and there are disadvantages such as third phase formation and attaining too high a pH. The aminopolycarboxylic acid may be furnished in the acid form or in the form of a soluble metal salt. In the preferred method of carrying out our invention, the aminopolycarboxylic acid is added as the sodium salt.

The minimum pH at which significant separation factors are obtained under otherwise optimum conditions is about 1.5. With a given concentration of aminopolycarboxylic acid, the separation factor increases as the pH is increased. For example, with a concentration of 0.008 molar pentasodium diethylenetriaminepentaacetate in 0.5 molar citric acid, the separation factor between cerium and americium in extraction by 0.3 molar di(2-ethylhexyl)phosphoric acid increases from 6 at pH 1.8 to 100 at pH 3.5. A further increase in pH does not increase the separation factor significantly, and an increase above a pH of about 4 has the adverse effect of increasing the solubility of the extractant in the aqueous phase.

The aqueous phase may contain either or both americium and curium, and any one or all of the fission products consisting of yttrium and the lanthanide rare earth elements. The rare earths may be present even in a high concentration without significantly changing separation factors. The aqueous phase may contain high concentrations of nitrate, and chloride may be present since it does not interfere, although, in view of its corrosive nature it is preferred that the aqueous solution be free of chloride.

If other elements are present, incorporation of other purification steps may be necessary if separation of actinide values from these other elements is desired.

The organic phase brought into contact with the aqueous phase consists of a diluent and an extracting agent. The extracting agent, a monoacidic organo-phosphorus compound, may be either a dialkylphosphoric acid, a alkyl hydrogen alkylphosphonate, or a mixture of the two. Each alkyl group may contain from 4 to 13 carbon atoms, and the group in the phosphonate having the carbon atom attached to the phosphorus atom may be either aryl or alkyl. Typically useful dialkylphosphoric acids are di(2-ethylhexyl)phosphoric acid, dibutylphosphoric acid, and ditridecylphosphoric acid. Typically useful phosphonate compounds are decyl hydrogen decylphosphonate, butyl hydrogen butylphosphonate, 2-ethylhexyl hydrogen phenylphosphonate, tridecyl hydrogen tridecylphosphonate, butyl hydrogen phenylphosphonate, and 2-ethylhexyl hydrogen benzylphosphonate. The preferred extractants are di(2-ethylhexyl)phosphoric acid and 2-ethylhexyl hydrogen phenylphosphonate.

Water-immiscible organic solvents known to be useful as diluents in liquid-liquid extraction processes, such as the petroleum hydrocarbons and aromatic compounds are useful in our process. In the preferred method of carrying out our process, aromatic diluents are used in the step of separating rare earths from americium and curium, and aliphatic diluents are used in the subsequent step of removing americium and curium from the aqueous phase, thus helping obtain the greatly different americium and curium distribution coefficients in the two steps.

The concentration of extracting agent in the diluent may be varied from 0.1 to 1.0 molar. We have found that the extraction coefficient for the actinides is proportional to about the 2.9 power of the concentration of the extracting agent, while extraction coefficient for the lanthanides is proportional to the 2.6 power of the concentration of the extracting agent. A low concentration will therefore give better separation of actinides from lanthanides than a high one. The concentration should be selected to give as high a separation factor as possible consonant with low loading of the organic phase.

After the aqueous phase has been contacted with extracting agent, the two phases are separated and actinide values are recovered from the aqueous phase. The actinide values can be recovered by extracting them from the aqueous phase under conditions conducive to their extraction. This may be accomplished by increasing the concentration of the extracting agent; by using a more effective extracting agent; by using a diluent, such as an aliphatic hydrocarbon which increases the extraction coefficient; or by any combination of these techniques. Extracted americium and curium may be stripped from the resulting organic phase by contact with an aqueous phase containing a mineral acid. Suitable stripping agents are aqueous solutions of nitric or hydrochloric acid in concentrations of 1 to 10 molar.

An excellent alternative method of recovering americium and curium from the raffinate comprises precipitating these elements as the oxalate. This procedure eliminates additional extraction and stripping cycles and the carboxylic acid and aminopolycarboxylic acids do not interfere with oxalate precipitation. We have found that addition of 0.5 to 1 molar oxalic acid is effective in recovering americium and curium as the oxalates.

Having thus described our invention the following examples are offered to illustrate our invention in more detail:

Example I

A ten milliliters portion of a solution containing americium, cerium, and europium was made 1 molar in lactic acid and 0.1 molar in diethylenetriaminopentaacetic acid (added as the sodium salt). The resulting aqueous solution, having a pH of 3.5, was contacted with 10 milliliters of 0.3 molar di(2-ethylhexyl)phosphoric acid in diisopropylbenzene. The two phases were mixed together and were then separated. Analyses were made of the activities of americium, cerium, and europium in each phase. These analyses showed that the cerium, europium, and americium distribution coefficients were 1.81, 1.24, and 0.0123 respectively. The cerium/americium and europium/americium separation factors were 147 and 101.

As can be seen from this example, an excellent separation of americium from cerium and europium can be achieved by our process.

The procedure of Example I was followed with other aqueous and organic solutions. The data from these experiments, identified as Examples II–X are given in the following table.

| Example No. | Organic phase | Aqueous phase | pH | Distribution coefficients, ea. | | | | | | | Separation factors | |
|---|---|---|---|---|---|---|---|---|---|---|---|---|
| | | | | Am | Cm | Ce | Eu | Tb | Tm | Y | Ce/Am | Eu/Am |
| II | 0.3 M HDEHP-DIPB | 0.5 M tartaric acid, 0.016 M Na₅DTPA. | 3.0 | 0.11 | | 11 | 11 | | | | 100 | 100 |
| III | 0.3 M HDEHP-DIPB | 0.5 M citric acid, 0.10 M Na₅DTPA. | 3.5 | 0.010 | 0.009 | 1.2 | 1.3 | | | | 120 | 130 |
| IV | 0.3 M HDEHP-DIPB | 1.0 M glycolic acid, 0.05 M Na₅DTPA. | 3.0 | 0.020 | | 2.1 | 1.7 | | 634 | 23 | 105 | 85 |
| V | 0.3 M HDEHP-DIPB | 1.0 M glycolic acid, 0.10 M Na₅DTPA. | 3.5 | 0.0082 | 0.0086 | 0.91 | 0.7 | | | | 110 | 85 |
| VI | 0.3 M HDEHP-DEB | 1.0 M glycolic acid, 0.05 M Na₅DTPA. | 3.0 | 0.008 | | 1.2 | | | | | 150 | |
| VII | 0.3 M HDEHP-DIPB | 1.0 M malonic acid, 0.10 M Na₅DTPA. | 3.3 | 0.014 | | 2.0 | 7.0 | | | | 145 | 500 |
| VIII | 0.3 M HDEHP-DIPB | 1.0 M lactic acid, 0.05 M Na₅DTPA. | 3.05 | 0.032 | | 4.7 | 2.9 | 17 | 564 | 19 | 150 | 90 |
| IX | 0.3 M HDEHP-dodecane | ...do... | 3.05 | 0.33 | | 43 | 25 | | | | 130 | 75 |
| X | 0.3 M HD(DP)-DIPB | 1.0 M glycolic acid, 0.05 M Na₅DTPA. | 3.0 | 0.011 | | 0.85 | 0.58 | | | | 77 | 53 |

HDEHP=Di(2-ethylhexyl)phosphoric acid. DIPB=Diisopropylbenzene. DEB=diethylbenzene. Na₅DTPA=pentasodium diethylentriaminepentaacetate. HD(DP)=decyl hydrogen decylphosphonate.

The above examples are intended to illustrate our invention, not to limit it. It is obvious that changes may be made in the content of both organic and aqueous solutions without departing from our invention. It is also obvious that equipment and techniques normally useful in liquid-liquid extraction processes, such as continuous countercurrent processing, and the use of scrubbing solutions are useful in our process. Accordingly, our process should be limited only in accordance with the following claims.

Having thus described our invention, we claim:

1. A process for separating and recovering actinide values selected from the group consisting of americium and curium values from an aqueous mixture containing said values together with fission product values selected from the group consisting of yttrium and lanthanide rare earth values comprising the steps of:
   (a) providing said aqueous mixture with an aminopolycarboxylic acid and a water-soluble organic acid having the formula $$R_1COOH$$

where $R_1$ is selected from the group consisting of hydrogen, alkyl, hydroxyalkyl, alkylcarboxyl, and aminoalkyl;
   (b) contacting the resulting aqueous solution with a substantially water-immiscible organic extractant comprising a diluent and a monoacidic organophosphorus compound selected from the group having the formula $$R_2O-\underset{\underset{OH}{|}}{\overset{\overset{OR_2}{|}}{P}}=O \quad \text{and} \quad R_3-\underset{\underset{OH}{|}}{\overset{\overset{OR_2}{|}}{P}}=O$$

where $R_2$ is an alkyl radical and $R_3$ is selected from the group consisting of alkyl and aryl radicals;
   (c) separating the resulting fission product-containing organic extractant from the resulting aqueous mixture, and
   (d) recovering actinide values from the separated aqueous mixture.

2. The process of claim 1 wherein the pH of the aqueous mixture containing the aminopolycarboxylic acid and the carboxylic acid is adjusted to a value from 1.5 to 4.

3. The process of claim 1 wherein the aminocarboxylic acid is selected from the group consisting of aminotriacetic acid, hydroxyethylethylenediaminetriacetic acid, ethylenediaminetetraacetic acid, 1,2-diaminocyclohexanetetraacetic acid, diethylenetriaminepentaacetic acid, and triethylenetetraaminehexaacetic acid.

4. The process of claim 1 wherein the carboxylic acid is selected from the group consisting of formic acid, acetic acid, glycolic acid, α-hydroxyisobutyric acid, mandelic acid, diglycolic acid, tartaric acid, latic acid, citric acid, malic acid, malonic acid maleic acid, mandelic acid, and glycine nitrate.

5. The process of claim 1 wherein the aminopolycarboxylic acid in the aqueous mixture is provided in a concentration of 0.005 to 0.2 molar and is selected from the group consisting of aminotriacetic acid, hydroxyethylethylenediaminetriacetic acid, ethylenediaminetetraacetic acid, 1,2-diaminocyclohexanetetraacetic acid, diethylenetriaminepentaacetic acid, and triethylentetraaminehexaacetic acid; and the carboxylic acid is selected from the group consisting of formic acid, acetic acid, glycolic acid, α-hydroxyisobutyric acid, mandelic acid, diglycolic acid, tartaric acid, lactic acid, citric acid, malic acid, maleic acid, malonic acid, and glycine nitrate.

6. The process of claim 5 wherein the pH of the aqueous mixture containing an aminopolycarboxylic acid and a carboxylic acid is adjusted to a value from 1.5 to 4.0.

7. The process of claim 1 wherein the diluent is an aromatic hydrocarbon and the extracting agent is present in a concentration of 0.1 to 1.0 molar.

8. The process of claim 1 wherein the actinide values are recovered from the separated aqueous mixture by contacting said aqueous mixture with an organic extractant comprising a straight chain hydrocarbon and an organophosphorous compound selected from the group having the formula $$R_2O-\underset{\underset{OH}{|}}{\overset{\overset{OR_2}{|}}{P}}=O \quad \text{and} \quad R_3-\underset{\underset{OH}{|}}{\overset{\overset{OR_2}{|}}{P}}=O$$

where $R_2$ is an alkyl radical and $R_3$ is selected from the group consisting of aryl and alkyl radicals; separating the resulting actinide-containing organic phase from the resulting aqueous phase; and contacting the separated organic phase with an aqueous solution of a mineral acid.

9. The process of claim 8 wherein the mineral acid is selected from the group consisting of nitric acid and hydrochloric acid and is in a concentration of 1 to 10 molar.

10. The process of claim 1 wherein the actinide values are recovered from the separated aqueous mixture by providing a source of oxalate ions in said mixture in a concentration sufficient to form an oxalate precipitate with said actinide values.

References Cited by the Examiner

UNITED STATES PATENTS 3,125,410  3/1964  Ballou _____ 23—14.5
3,161,463  12/1964  Orr _____ 23—14.5

LEON D. ROSDOL, *Primary Examiner.*

S. TRAUB, *Assistant Examiner.*